United States Patent Office 2,727,037
Patented Dec. 13, 1955

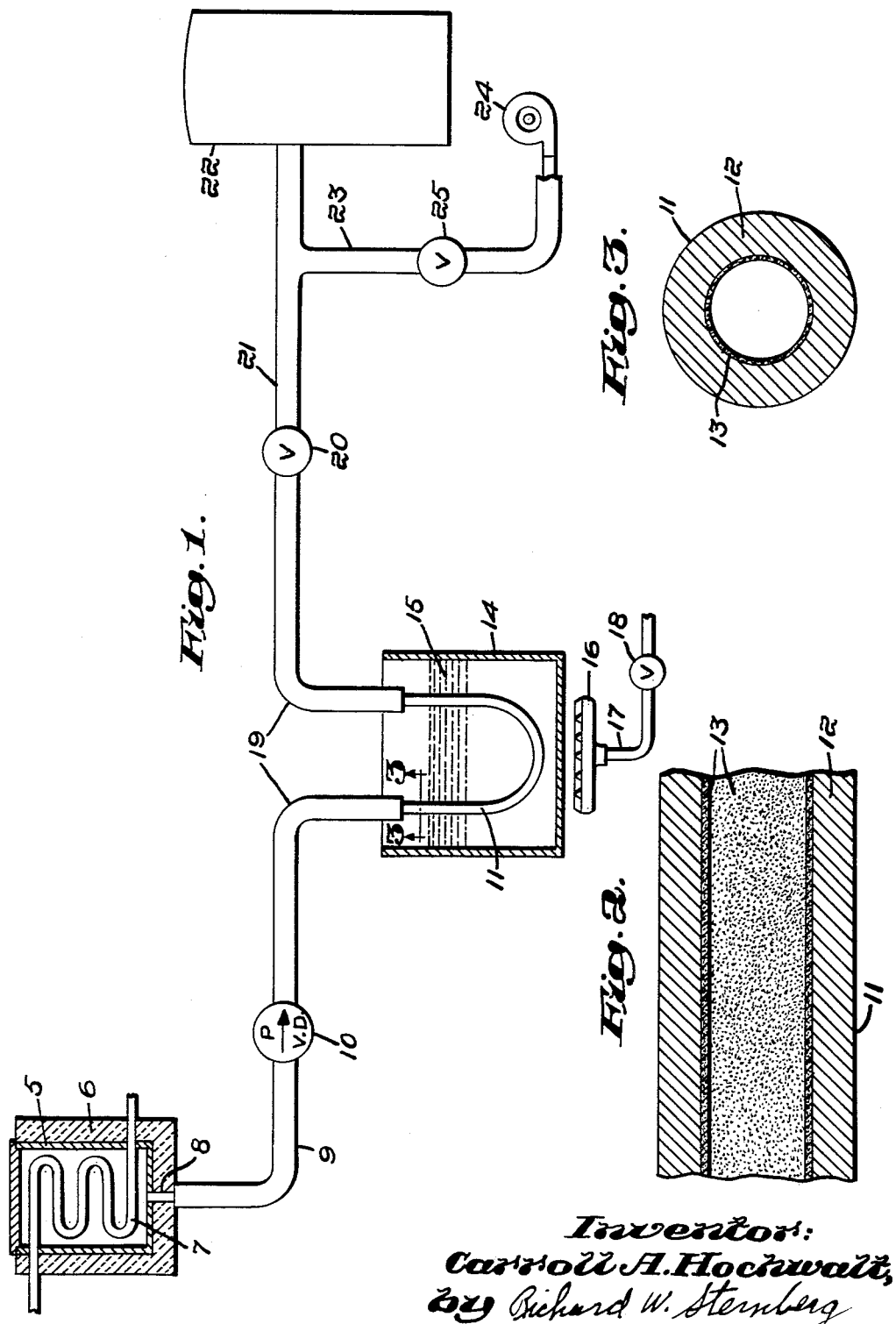

2,727,037
DEVICE AND PROCESS FOR PREPARING MELAMINE

Carroll A. Hochwalt, Clayton, Mo., assignor to Monsanto Chemical Company, St. Louis, Mo., a corporation of Delaware Application June 13, 1952, Serial No. 293,248

8 Claims. (Cl. 260—249.7)

The present invention relates to improvements in the manufacture of melamine, particularly in the manufacture of melamine from urea. The present invention also relates to improved devices which are particularly useful in the manufacture of melamine.

It has been proposed heretofore to prepare melamine from urea by heating a mixture of urea and melamine at a temperature of 275 to 500° C. and at a superatmospheric pressure of at least 350 atmospheres in a pressure resistant reactor made of or lined with silver, glass, stainless steel or platinum. Materials such as silver and platinum are quite expensive even if they are only used in the form of a lining and therefore considerable capital outlay is required in using such materials in a commercial scale plant. Materials such as glass, on the other hand, are not practical in a large scale plant because of their tendency to crack or break under conditions of thermal or mechanical shock, and due to other difficulties such as difficulty of machining and the like. Materials such as the stainless steels have been found to corrode rapidly under the high temperatures and pressures used in converting urea to melamine with the result that the reactor fails in a relatively short time. Hence such materials are not considered to be practical per se in commercial scale plants.

It has also been the experience heretofore in the conversion of urea to melamine in reactor tubes which have a relatively small diameter and are constructed of a normally corrosion resistant alloy such as the various stainless steel that corrosion of the inner surface of the tubes occurs very readily with the result that the tubes fail in a relatively short period of time.

In accordance with the present invention, it is possible to carry out the conversion of urea or similar melamine precursors to melamine in durable metal reactors or reactor tubes, which are constructed of relatively inexpensive corrosion resistant alloys, with materially less corrosion difficulties than has been possible heretofore. Moreover, by the use of the reactors of this invention it is also possible to catalyze the conversion of urea or similar melamine precursors to melamine so that the conversion will proceed more rapidly.

It is, accordingly, one object of this invention to provide a process for carrying out the conversion of urea or other melamine precursors to melamine in a metal reactor which will not corrode readily, yet is durable and relatively inexpensive.

It is a further object of this invention to provide a durable and relatively inexpensive metal reactor in which urea or a melamine precursor may be converted to melamine, and which is capable of resisting corrosion to a greater extent than reactors made from corrosion resistant alloys per se.

Still further objects and advantages of this invention will become apparent from the following description when considered in connection with the accompanying drawing and the appended claims.

In the accompanying drawing, which forms a part of this specification, and in which like numerals are employed to designate like parts throughout the same, Figure 1 is a side elevation of a melamine producing device embodying the present invention, Figure 2 is an enlarged central vertical longitudinal section of a portion of a reactor tube shown in Figure 1, and, Figure 3 is an enlarged cross-section of a reactor tube taken along the line 3—3 of Figure 1.

In the drawing wherein, for the purpose of illustration, is shown a preferred embodiment of the present invention, the numeral 5 designates a metal vessel or other suitable vessel, which is capable of being heated, for melting urea or some similar melamine precursor. This vessel is preferably provided with an insulation covering 6 to prevent excessive heat loss. A heating coil or pipe 7 is positioned inside of the vessel, and this pipe is heated by means of steam or some hot fluid (from a source not shown) to melt the urea or melamine precursor in the vessel. A conduit or pipe 8 is fastened to the bottom of vessel 5 by a weld or in some other suitable manner so that this pipe opens into the vessel and serves as a means for removing or draining molten urea from the vessel. The pipe 8, which is preferably covered with insulation 9, is also connected to the intake or input end of a variable-delivery, displacement pump 10. A pressure resistant reactor tube 11 is connected to the output or outlet end of pump 10, and is positioned horizontally except for a U-shaped portion in which the bulk or major portion of the conversion of urea or melamine precursor to melamine takes place, the U-shaped portion of the tube 11 being arranged generally vertically. The reactor tube 11, which is illustrated in greater detail in Figures 2 and 3, has a wall 12 which is relatively thick in relation to the internal diameter of the tube. Such reactor tube is suitably constructed of a pressure and corrosion resistant metal as, for example, a pressure and corrosion resistant alloy such as the various stainless steels or other alloys based on chromium and nickel, and it is also possible, in some instances, to use inexpensive metals such as steel or iron even though such metals per se have relatively little resistance to corrosion. The reactors or reactor tubes of this invention may be lined with precious metals but this is not necessary, and it is preferred to avoid the use of precious metals.

In accordance with the present invention the inner wall of the reactor tube 11 or that portion thereof which is exposed to conversion products of urea or the melamine precursor, is provided with a continuous coating of a phosphorous compound such as phosphorous pentoxide, the alkali metal pyrophosphates or metaphosphates or the alkali earth metal pyrophosphates or the like, which coating is designated by the numeral 13 in Figures 2 and 3. This coating, which is substantially impervious to the passage of gases, liquids or solids therethrough, is firmly bonded to the inner surface of wall 12 and thus does not crack or flake off readily under the operating conditions used. The phosphorous compound coating may be of any suitable thickness, but it is preferred to use a coating which is sufficiently thick to withstand the attrition or erosive effect of gases, liquids or solid particles over a comparatively long period of time. In general, a coating thickness of about 0.005 to 0.1 inch is satisfactory, although a thicker coating may be used if desired. The phosphorous compound employed as the coating should be a compound which does not fuse or melt under the melamine conversion conditions of temperature and pressure, and which, if it does have a tendency to sublime, reacts with the urea or melamine precursor conversion products to form a substantially non-volatile product. For example, sodium pyrophosphate or the anhydrous alkali metal tribasic phosphates or metaphosphates have a high melting point and are substantially non-volatile and are particularly useful. Phosphorous pentoxide also has a high melting point but does have a tendency to sublime. However, phosphorous pentoxide does react with ammonia which is a conversion product of urea or a similar melamine precursor to form a substantially non-volatile, non-fusible, nitrogen-oxygen-phosphorous complex which remains in the form of a coating in the tube 11. Accordingly, phosphorous pentoxide is particularly useful as a coating also.

The phosphorous compound coating on the inner wall of the reactor tube 11 serves to minimize corrosion of the reactor tube by substantially preventing the gases, liquids or solids present in the tube from contacting the inner walls of the tube 11. Moreover, the phosphorous compound coating also serves to catalyze the conversion of urea or other melamine precursor in the tube to melamine and thus speeds up the rate of conversion.

The U-shaped portion of reactor tube 11 dips into a container or vessel 14 which is partially or substantially filled with a relatively non-volatile, fusible substance 15 such as lead or sodium nitrate, which substance melts at a temperature below the melamine conversion temperature. A gas burner 16 is provided for heating the vessel 14 to melt the fusible substance 15, and to provide the necessary heat input to maintain the desired temperature. Gas or some combustible gaseous fuel is supplied (from a source not shown) to the burner by means of pipe 17 which is provided with a valve 18 to control the flow of gas.

The fusible substance 15 is used to supply heat to the reactor tube for the conversion of urea or melamine precursor in the tube to melamine. Accordingly, this substance should cover an area of the reactor tube sufficient to supply the necessary heat input. Moreover, the fusible substance should be capable of being heated to relatively high temperatures, for example 600° C. without decomposition or excessive vaporization.

The reactor tube 11, which is provided with an insulation covering 19, except for that portion of the tube which is immersed in the fusible substance 15, is connected to a hot letdown valve 20 which releases the melamine and other products in the tube, whether such products be in the gaseous, liquid or particulate solid form, from the operating pressure in the tube to atmospheric pressure, while maintaining the operating pressure in the tube. Valves of this type are conventional and are known in the art.

An insulated pipe 21 is connected to the low pressure or atmospheric pressure end of the let-down valve and terminates in a bag filter 22 which comprises a close mesh fabric which is designed to retain large or small solid particles, but is sufficiently porous to permit the egress of gases between the interstices of the fabric.

An insulated vertically arranged pipe 23 is connected to pipe 21 and is provided with a blower 24 for blowing air or some inert gas into pipe 21 to assist in the removal of products from pipe 21. The pipe 23 is provided with a valve 25 for controlling the flow of air or inert gas.

The entire inner wall of the reactor tube may be provided with the phosphorous compound coating referred to above, but this is not essential. It is important, however, that the portion of the reactor tube in which the conversion of urea or other melamine precursor to melamine is effected be provided with such coating since it is in such portion of the tube that corrosion is most severe and troublesome. Thus, it is possible to use a reactor tube in which only the heated portion is internally liner or coated with the phosphorous compound coating as, for example, in the U-shaped portion shown in the drawing.

The operation of the melamine producing device is as follows:

Urea or some other melamine precursor which forms corrosive products on heating is charged to the melter 5 to which sufficient heat is supplied by heating coil 7 to cause the urea or melamine precursor to melt and remain in a molten condition, desirably at a temperature between the melting point and its decomposition temperature, preferably between 140 and 275° C. in the case of urea. The molten urea or precursor flows from the melter by gravity through insulated pipe 8 to the variable delivery pump 10 from whence it is pumped under pressure through the reactor tube 11, the inner surface of which is provided with a continuous coating of a phosphorous compound of the type hereinbefore described. As the molten urea or precursor is continuously pumped through the reactor tube 11 it is continuously heated to the melamine conversion temperature in the U-shaped portion of tube 11, which portion is heated by the molten bath 15, and the urea or precursor is continuously converted to melamine and various by-products such as ammonia and carbon dioxide, which by-products are generally of a gaseous nature. The phosphorous compound coating on the inner wall of the reactor tube substantially prevents the conversion products of the urea or precursor from contacting the inner metal surface of the reactor tube and thus prevents corrosion of the tube. Moreover, such coating inhibits corrosion of the metal tube as to any conversion products which penetrate the coating, and also catalyzes the conversion of the urea or precursor to melamine thus effecting an increased rate of conversion. The products formed in the tube, which products are at superatmospheric pressure, pass through hot let-down valve 20 which is controlled or adjusted to maintain the pressure in the reactor tube 11 substantially constant. As the products in the reactor tube are released through valve 20, the pressure on the released products decreases to atmospheric pressure or slightly above atmospheric pressure in insulated pipe 21, and the products are removed from the pipe 21 by their own velocity and, in part, by a stream of gas such as air or some inert gas which is blown through pipe 23 and thence through pipe 21 by means of blower 24. The solid particles in pipe 21, which particles include melamine particles, are retained by the bag filter 22 as they issue from pipe 21 and the gases from pipe 21 pass through the interstices of the bag filter.

Although the drawing depicts a device for producing melamine, which may be operated continuously or intermittently, and includes a reactor tube, it is to be understood that the present invention is not to be restricted to such a device since the principles of the present invention may suitably be practiced in other devices having a pressure resistant reactor made of a corrosion resistant alloy or even of iron or steel, the surface of which is exposed to the products formed in the conversion of urea or other melamine precursors to melamine. Thus, it is possible in accordance with the present invention to carry out the conversion of urea or a melamine precursor to melamine, batchwise, in an autoclave made, for example, of stainless steel the inner surface of which is lined or covered with a continuous coating of a phosphorous compound of the type hereinbefore described. Such a coating not only serves to minimize or inhibit the corrosion of the autoclave which would normally occur if such an alloy was used alone, but also catalyzes or speeds up the conversion. Broadly stated the present invention encompasses or covers the use of any high pressure device in which urea or a melamine precursor is converted to melamine under melamine conversion conditions of heat and pressure, and wherein the inner surface of that portion or part of the device which is exposed to the conversion products of such materials to melamine is lined or provided with a continuous coating of the phosphorous compound. Broadly stated the present invention also encompasses or covers a process of preparing melamine from urea or a melamine precursor in which the products formed during the conversion of the urea or melamine precursor to melamine are only in contact with a surface which consists of the phosphorous compound.

Although the device described herein does not show means for using a gaseous material along with urea or a melamine precursor, it is possible in accordance with the present invention to use an inert gas in such instances, or gases such as ammonia or carbon dioxide, or both, which are commonly formed during the preparation of melamine from melamine precursors. Ammonia is commonly used, for example, to minimize deamination of the melamine produced.

In accordance with the present invention, the conversion of urea or a melamine precursor to melamine may be effected under various conditions of operation, for example, at temperatures between about 300 and 600° C., preferably between about 325 and 450° C. and at pressures above 700 pounds per square inch, preferably between about 2,000 and 10,000 pounds per square inch.

The reactors or reactor tubes described herein may suitably be provided with a continuous lining of the phosphorous compound by passing a continuous stream of $P_2O_5$ vapors through the reactor or reactor tube, while cooling the walls thereof, until a continuous coating of $P_2O_5$ of the desired thickness has deposited on the inner surface of the reactor or reactor tube, or by coating the reactors or reactor tubes with a solution of the phosphorous compound and drying the coating. The latter procedure may be repeated until a coating of the desired thickness is obtained.

*Example*

Molten urea is continuously pumped through a pressure resistant reactor tube having an inside diameter of $5/16$ inch which is made of stainless steel AISI type 316 and has an inner continuous lining of $P_2O_5$. The molten urea is heated in the tube to a temperature of 400° C. and at a pressure of 4000 pounds per square inch until the urea is converted primarily to melamine, after which the products in the tube are released through a hot letdown valve, while maintaining the pressure in the tube at about 4000 pounds per square inch. The tube is capable of being operated for some time without excessive corrosion of the inner wall thereof, and the conversion of urea to melamine is also catalyzed.

Although urea is the melamine precursor specifically referred to in the foregoing description, it is possible to use other melamine precursors in the devices and processes of this invention as, for example, cyanuric acid, ammeline, ammelide, cyanic acid and ammonia, biuret or the like. Accordingly, it is to be understood that it is not intended to restrict the present invention to the use of urea as a melamine precursor. However, urea is a cheap raw material and the intermediate products obtained therefrom on heating prior to the actual formation of melamine are particularly corrosive. Because of these factors and since the use of the devices and processes of this invention are particularly effective in the conversion of urea to melamine, it is preferred to use urea as the melamine precursor herein.

Various modifications and changes may be made in the devices and processes described herein as will be apparent to those skilled in the art to which this invention appertains without departing from the spirit and intent of this invention. Accordingly, it is to be understood that it is not intended to limit the present invention except by the scope of the appended claims.

What is claimed is:

1. A process of producing melamine which comprises heating a melamine precursor at temperatures between about 300° and 600° C. and at a pressure of at least 700 p. s. i. in a pressure-resistant metal reactor having a continuous coating of at least 0.005 inches thickness of a phosphorous compound, which is substantially non-fusible at said temperatures, on those surfaces of the reactor which are exposed to the conversion products formed from said precursor, until said precursor is converted to melamine.

2. A process of producing melamine which comprises heating urea at temperatures between about 325° and 450° C. and at pressures between about 2000 and 10,000 p. s. i. in a pressure-resistant reactor made of a non-precious metal alloy and having a continuous coating of at least 0.005 inches thickness of a phosphorous compound on those surfaces thereof which are exposed to the conversion products formed from said urea, until melamine is formed, said phosphorous compound being further characterized in that it is substantially non-fusible at the temperatures employed.

3. A process as in claim 2, but further characterized in that said reactor is made of stainless steel.

4. A continuous process for producing melamine which comprises continuously forcing molten urea under pressure through a pressure-resistant, metal reactor tube having a continuous coating of at least 0.005 inches thickness of a phosphorous compound on the inner surfaces thereof which are exposed to urea conversion products, which phophorous compound is characterized in that it is substantially non-fusible at melamine conversion temperatures, continuously heating the molten urea in the tube at temperatures between about 325° and 450° C. and at pressures between about 2000 and 10,000 p. s. i. whereby melamine and urea conversion products are formed, and continuously releasing melamine and urea conversion products from said tube while maintaining the pressure in the tube substantially constant.

5. A process as in claim 4, but further characterized in that the phosphorous compound is phosphorous pentoxide.

6. A process as in claim 4, but further characterized in that the phosphorous compound is selected from the group consisting of sodium pyrophosphate, sodium metaphosphate and sodium tribasic phosphate.

7. A process for producing melamine which comprises heating a melamine precursor at temperatures between about 300° and 600° C. and at a pressure of at least 700 p. s. i. in a reaction zone comprising a continuous surface layer of at least 0.005 inches thickness of a phosphorous compound, which is substantially non-fusible at said melamine conversion temperatures, until melamine is formed.

8. A process as in claim 7, but further characterized in that said melamine precursor is urea.

References Cited in the file of this patent

UNITED STATES PATENTS

| | | |
|---|---|---|
| 2,312,754 | Davy | Mar. 2, 1943 |
| 2,365,851 | Thomas | Dec. 26, 1944 |
| 2,550,659 | Vingee | Apr. 24, 1951 |